United States Patent
Pawar et al.

(10) Patent No.: US 11,470,128 B2
(45) Date of Patent: Oct. 11, 2022

(54) SYSTEM AND METHOD FOR PROVIDING SIP TRUNK SERVICE TO A TELEPHONE SYSTEM

(71) Applicant: Reliance Jio Infocomm Limited, Gujarat (IN)

(72) Inventors: Anil Pawar, Maharashtra (IN); Vinayak Kasar, Maharashtra (IN)

(73) Assignee: JIO PLATFORMS LIMITED

(*) Notice: Subject to any disclaimer, the term of this patent is extended or adjusted under 35 U.S.C. 154(b) by 4 days.

(21) Appl. No.: 16/785,801

(22) Filed: Feb. 10, 2020

(65) Prior Publication Data
US 2020/0287943 A1  Sep. 10, 2020

(30) Foreign Application Priority Data

Feb. 8, 2019 (IN) .............................. 201921004998

(51) Int. Cl.
| | |
|---|---|
| *H04L 65/1104* | (2022.01) |
| *H04L 65/1016* | (2022.01) |
| *H04L 65/102* | (2022.01) |
| *H04L 65/1063* | (2022.01) |
| *H04L 65/80* | (2022.01) |
| *H04L 69/16* | (2022.01) |
| *H04L 12/28* | (2006.01) |
| *H04L 69/40* | (2022.01) |
| *H04L 67/141* | (2022.01) |

(52) U.S. Cl.
CPC ........ *H04L 65/1104* (2022.05); *H04L 65/102* (2013.01); *H04L 65/1016* (2013.01); *H04L 65/1063* (2013.01); *H04L 65/80* (2013.01); *H04L 69/16* (2013.01)

(58) Field of Classification Search
CPC ............ H04L 65/1006; H04L 65/1016; H04L 65/102; H04L 65/1063; H04L 65/80; H04L 69/16; H04L 29/06; H04L 29/14; H04L 29/08; H04L 12/28
USPC ........................................................ 370/259
See application file for complete search history.

(56) References Cited

U.S. PATENT DOCUMENTS

| | | | |
|---|---|---|---|
| 7,466,810 B1 * | 12/2008 | Quon ................ | H04M 3/42229 379/201.01 |
| 2008/0219268 A1 * | 9/2008 | Dennison ................ | H04L 45/22 370/395.2 |
| 2010/0303012 A1 * | 12/2010 | Atarius ............... | H04L 65/1016 370/328 |

(Continued)

*Primary Examiner* — Umar Cheema
*Assistant Examiner* — Tony Williams
(74) *Attorney, Agent, or Firm* — Finnegan, Henderson, Farabow, Garrett & Dunner LLP (57) ABSTRACT

Present disclosure relates to system and method for providing SIP trunk service to at least one telephone system by an application server over a network, comprising establishing a connection between at least one telephone system and a first network entity via a first access node, and availing at least one SIP trunk service. Next, the at least one telephone system dynamically checks connectivity with the first network entity. The at least one telephone system establishes a connection with a second network entity via a second access node, in an event the connectivity with the first network entity fails and transmits a signal request to the application server. The application server processes the signal request and provides the at least one SIP trunk service to the at least one telephone system.

10 Claims, 7 Drawing Sheets

(56) References Cited

U.S. PATENT DOCUMENTS

| | | | |
|---|---|---|---|
| 2011/0113141 A1* | 5/2011 | Veenstra | H04L 65/1006 709/226 |
| 2011/0216766 A1* | 9/2011 | Peters, Jr. | H04L 29/06027 370/352 |
| 2012/0020293 A1* | 1/2012 | Nix, Jr. | H04M 1/2535 370/328 |
| 2013/0322249 A1* | 12/2013 | Heinz | H04L 45/24 370/235 |
| 2015/0373061 A1* | 12/2015 | Wiley | H04W 40/02 370/352 |

* cited by examiner

SYSTEM AND METHOD FOR PROVIDING SIP TRUNK SERVICE TO A TELEPHONE SYSTEM

CROSS REFERENCE TO RELATED APPLICATIONS

This application claims priority to Indian Patent Application No. 201921004998, filed Feb. 8, 2019, the disclosure of which is hereby incorporated by reference in its entirety.

TECHNICAL FIELD

The present invention relates to the technical field of SIP trunk based communication system. More particularly, the present invention relates to a method and a system of providing SIP trunk service in a hetnet environment.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The older communication technology, for instance, the Public Switched Telephone Network (PSTN), with its analog lines, ISDN BRI, E1 or T1 lines, are now mostly outdated. The telephone technology is now shifting from PSTN to flexible SIP Trunks, where SIP Trunks are phone line trunks delivered over IP using the SIP protocol. Using this standard protocol, telecom service (VoIP) providers connect one or more channels to the customer's PBX (Phone Exchange System). Phone numbers and DIDs (Direct inward dialing numbers) are linked to the SIP trunk. In many cases, numbers can be ported to the SIP Trunk.

SIP trunk enables the end point's PBX to send and receive calls via the Internet. As SIP uses signaling protocol for multiple real-time application, SIP trunk is able to control voice, video and messaging applications. It is also a voice over Internet Protocol (VoIP) technology and streaming media service based on the Session Initiation Protocol (SIP) by which Internet telephony service providers (ITSPs) deliver telephone services and unified communications to customers equipped with SIP-based private branch exchange (IP-PBX) and unified communications facilities. Most unified communication applications provide voice, video, and other streaming media applications such as desktop sharing, web conferencing, and shared whiteboard.

Further, availability of the SIP trunk service is a major challenge in order to provide services to customers even if one of the ESBC is down or not reachable from IMS core or PBX, for instance, a blackspot which is generally defined as a geographic area that experiences non-availability of service which may be due to shut down of one entity. The existing solutions in the field of SIP trunk service have not been able to assure services to the customers in event of blackspot for those customers. Impact of such blackspot include service/blackout, internet timeouts, poor SLA for voice services, no guarantee of retention of the same number if any of the access nodes fails, outages to services even though primary nodes are isolated and no guarantee of revenue retention due to service continuity issues.

The existing techniques to mitigate the risk if one of the access node fails have been inefficient to remedy the blackouts in an optimized way. Thus, there exists a need in the art to find a solution for a system and a method providing availability of the SIP trunk service when one of the access nodes is down connected on the LAN with the fiber backhaul or vice versa and that without (or with minimal impact) impacting the subscriber's experience if one of the ESBC is down or not reachable from IMS core or PBX. Therefore, in view of the above shortcomings in the existing approaches, there is a need in the art to provide an efficient solution for providing at least one SIP trunk service to at least one telephone system [102] by an application server over a fixed-line network.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present invention is to provide a system and a method of providing SIP trunk service to a telephone system (for instance, an enterprise) by an application server over a network. Another object of the present disclosure is to provide a system and a method to ensure availability of the SIP trunk services when one of the access nodes is down, and the system is connected on the LAN with the fiber backhaul or vice versa. Yet another object of the present disclosure is to provide a system and a method to provide service with maximum uptime for voice services and provide an alternative solution in case of an outage. Yet another object of the present disclosure is to provide a system and a method for providing continuity in service and reduce outage even though the Primary nodes are isolated. Yet another object of the present disclosure is to reduce service outage cost to all home/enterprise customer on their network.

In order to achieve at least some of the above-mentioned objectives, the present disclosure provides a method and system for providing at least one SIP trunk service to at least one telephone system by an application server over a network. A first aspect of the present invention relates to a method of providing at least one SIP trunk service to at least one telephone system by an application server over a network. The method comprising establishing a connection between at least one telephone system and a first network entity of the network via a first access node, wherein said first network entity is connected to the application server. Next, the at least one telephone system starts availing at least one SIP trunk service, via the first access node, from the application server connected to the first network entity. Further, the at least one telephone system keeps checking, dynamically, it's connectivity with the first network entity via the first access node. Furthermore, the at least one telephone system establishes a connection between the at least one telephone system and a second network entity of the network via a second access node, in an event the connectivity between the at least one telephone system and the first network entity via the first access node fails, wherein said second network entity is connected to the application server. Next, the at least one telephone system transmits a signalling request to avail the at least one SIP service, via the second access node, to the application server connected to the second network entity. Subsequently; the application server connected to the second network entity processes the signalling request received from the at least one telephone system via the second access node. Finally, the application server connected to the second network entity provides the at least one SIP trunk service, to the at least one telephone system via the second access node.

Yet another aspect of the present invention relates to a system for providing at least one SIP trunk service to at least one telephone system by an application server over a network. The system comprises of an application server, at least one telephone system, at least one network entity and at least one access node. The application server is configured to provide at least one SIP trunk service to at least one telephone system over the network. The at least one network entity is connected to the application server. The at least one network entity is configured to route the at least one SIP trunk service to the at least telephone system. The at least one telephone system is configured to establish a connection with a first network entity of the network via a first access node. The at least one telephone system is also configured to avail at least one SIP trunk service, via the first access node, from the application server connected to the first network entity. The at least one telephone system is also configured to check, dynamically, connectivity with the first network entity via the first access node. The at least one telephone system is further configured to establish a connection with a second network entity of the network via a second access node, in an event the connectivity with the first network entity via the first access node fails. The at least one telephone system is further configured to transmit a signalling request to avail the at least one SIP service, via the second access node, to the application server connected to the second network entity. The application server is further configured to process the signalling request received from the at least one telephone system via the second access node. The application server is further configured to provide the at least one SIP trunk service to the at least one telephone system via the second access node.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the disclosure, but the possible variants of the method and system according to the disclosure are illustrated herein to highlight the advantages of the invention. It will be appreciated by those skilled in the art that disclosure of such drawings includes disclosure of electrical components or circuitry commonly used to implement such components.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

As used herein, the "telephone system" refers to any electrical, electronic, electromechanical and computing multiline network of telephone units. For instance, the telephone system may be one of an enterprise unit including, but not limited to a Private Branch Exchange (PBX), a Unified Border Element (UBE) and a Unified Communications Manager (UCM), or any other such telephone system obvious to a person skilled in the art. The users of the telephone system may communicate internally (within the network) and externally (with the outside world), using different communication channels like Voice over IP, ISDN or analog.

As used herein, a "processor" or "processor" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processor is a hardware processor.

As used herein, a "controller" or "control unit" includes one or more controllers, wherein the controller refers to any logic circuitry for processing instructions. A controller may be a general-purpose controller, a special-purpose controller, a conventional controller, a digital signal controller, a plurality of microcontrollers, one or more microcontrollers in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor.

As used herein, "memory unit" refers to a machine or computer-readable medium including any mechanism for storing information in a form readable by a computer or similar machine. For example, a computer-readable medium includes read-only memory unit ("ROM"), random access memory unit ("RAM"), magnetic disk storage media, optical storage media, flash memory unit devices or other types of machine-accessible storage media.

As used herein, the "network" may include, but not limited to any enterprise network with wired and wireless interfaces, or a private or public wireless LTE network, wireless 5G network or any other network that may be presently implemented or deployed, or any network that may be deployed in the future obvious to a person skilled in the art. The network is capable of facilitating SIP trunk service to telephone systems (for instance, a PBX, a UBE, a UCM, etc.).

Systems depicted in some of the figures may be provided in various configurations. In some embodiments, the systems may be configured as a distributed system where one or more components of the system are distributed across one or more networks in a cloud computing system.

The present disclosure provides a system and a method of providing at least one SIP trunk service to at least one telephone system by an application server over a network. The solution of the present invention focusses at providing availability of the SIP trunk service when one of the access nodes is down, where such an access node is connected on the LAN with the fiber backhaul.

As used herein, "network entity" is an entity that serves a network for providing voice services (calls) and the data services to the telephone system (for instance, a PBX, UBE or UCM). The network entity may include, but not limited to, Enterprise Access Session Border Controller (E-SBC), HSS (Home Subscriber Server), DNS (Domain Name server), Proxy call session control function (P-CSCF), Interrogating call session control function (I-CSCF), a Serving call session control function (S-CSCF), an Emergency call session control function (E-CSCF), a Interconnect border control function (I-BCF) and a Breakout gateway control function (BGCF), and any such entity obvious to a person skilled in the art.

Figure 1:
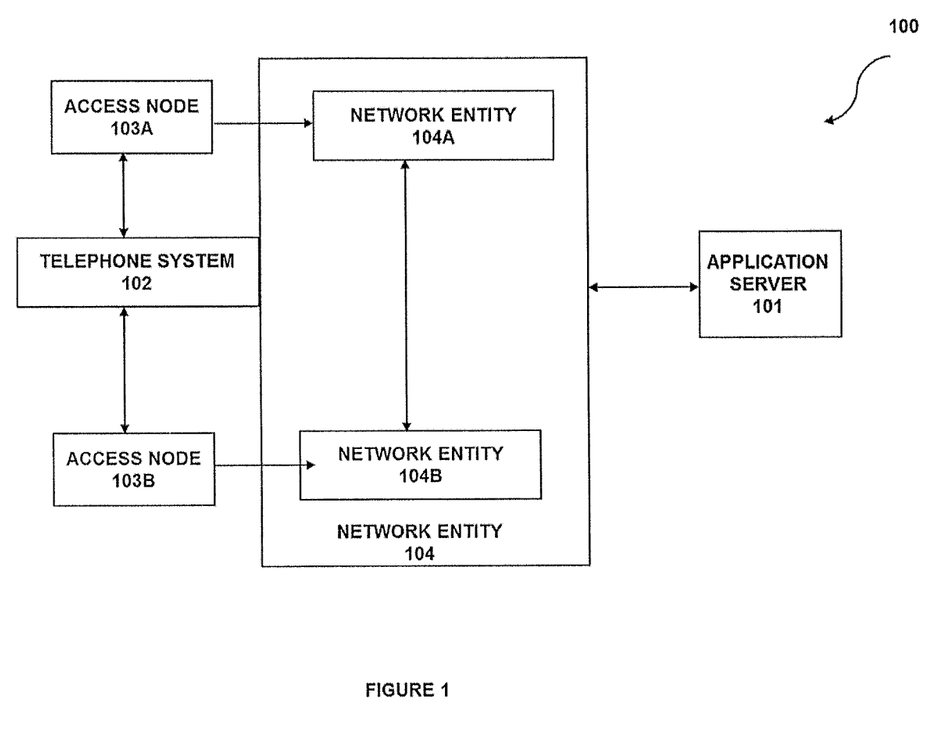
FIG. 1 illustrates an exemplary block diagram of a system [100] for providing at least one SIP trunk service to at least one telephone system by an application server over a network, in accordance with exemplary embodiments of the present disclosure.

Referring to FIG. 1 illustrates an exemplary block diagram of a system [100] for providing at least one SIP trunk service to at least one telephone system by an application server over a network, in accordance with exemplary embodiments of the present disclosure. The system comprises an application server [101], a first network entity [104A], a second network entity [104B], a first access node [103A], a second access node [103B], and at least one telephone system [102]. The first network entity [104A] and the second network entity [104B] may collectively be referred to as at least one network entity [104]. Similarly, the first access node [103A] and the second access node [103B] may collectively be referred to as at least one access node [103].

The application server [101] is configured to provide at least one SIP trunk service to at least one telephone system [102] over the network. The application server [101] is connected to the at least one network entity [104], and accordingly, the application server [101] provides at least one SIP trunk service to at least one telephone system [102] via the at least one network entity [104]. The present invention encompasses that the at least one SIP service is a calling service.

For instance, the present invention encompasses the application server [101] is a Business Telecommunication Application Server (BTAS). The BTAS may be a part of the Enterprise Wireline IMS Core network that provides SIP Trunking Services to the Enterprise. The BIAS may be integrated with the existing network ecosystem such as IMS, OSS, BSS, etc. The BTAS may be configured to provide full-featured telephony along with a multimedia application system that integrates real-time communications such as instant messaging, presence, voice/video telephony and conference and can also be integrated with other applications such as email, calendar, contacts, voice-mail and fax services.

Further, BTAS may be configured to provide services to the enterprise subscribers based on the configured policies e.g. call screening, call routing policies. BIAS may also include features including, but not limited to, call park, call pickup, call delegation, assistant console, etc. Further, BTAS may be configured to manage number translation and call routing along with the facility for feature activation/deactivation based on special code/vertical service code. BIAS may also be integrated with web services, such as, REST, SOAP/XML, HTML5, etc. to provide additional functionalities.

Furthermore, the present invention encompasses that BTAS may also implement configuration changes to enable forwarding of call on specific response codes. BTAS may be configured to route a call to the network entity based on cause codes. For instance, BIAS may be configured to identify and execute at least one of the 408 request timeout, 500 server internal error, 503 service unavailable, and 480 temporary unavailable, and based one of the cause codes mentioned above for primary domain BTAS may route calls to S-CSCF.

The at least one network entity of the network is connected to the application server [101]. The at least one network entity is configured to route the at least one SIP trunk service to the at least telephone system [102]. The at least one network entity [104] may be connected to other network entity and to the other network elements. For instance, the present invention encompasses that the at least network entity [104] is an Enterprise Access Session Border Controller (ESBC). Accordingly, the ESBC is connected to the at least one telephone system and to the application server [101]. The present invention further encompasses that the first network entity [104A] is a Primary Enterprise Access Session Border Controller (PR-ESBC) and the second network entity [104B] is a Secondary Enterprise Access Session Border Controller (GR-ESBC).

Further, the exemplary ESBC may be configured as a voice firewall to protect core network elements from Distributed Denial-of-Service (DDoS) attack and other unexpected potential intrusions from enterprises. ESBC may be configured as a single point of contact for customer network for availing SIP trunk services. Furthermore, the ESBC may be configured to implement Call Admission Control (CAC) for the inbound traffic sent by an enterprise customer on the basis of concurrent calls and Call Per Second (CPS) for a particular trunk or customer.

Additionally, the ESBC may be configured to provide multiple access interface to enterprise customers such as service over MPLS, ILL and Public Internet. Enterprise customers typically use private IP addressing within the enterprise. Interfacing with customers with such overlapping private address space would have to be handled by the service provider. ESBC can provide the solution to handle multiple customer overlapping IP addresses by segregating customer wise VLAN/VRFs right from customer premises till the ESBC.

The at least one telephone system [102] is configured to establish a connection with at least one network entity [104]. The at least one telephone system [102] may further comprise at least one telephone unit (for instance, enterprise subscribers). The at least one telephone system [102] is configured to first network entity [104A] of the network via a first access node [103A].

The at least one telephone system [102] is also configured to avail at least one SIP trunk service, via the first access node [103A], from the application server [101] connected to the first network entity [104A]. For instance, PBX establishes a connection with a primary Enterprise Access Session Border Controller (PR-ESBC) over a first access node, like a Voice over Internet Protocol (VoIP), and starts availing SIP trunk services, via VoIP, from the BTAS connected to the PR-ESBC.

The at least one telephone system [102] is also configured to check, dynamically, connectivity with the first network entity [104A] via the first access node [103A]. The at least one telephone system [102] is also configured to checks, dynamically, connectivity with the first network entity [104A] via the first access node [103A] a regular interval of time. The at least one telephone system may be one of a Private Branch Exchange (PBX), a Unified Border Element (UBE) and a Unified Communications Manager (UCM), or any other such system encompassed by a person skilled in the art. For instance, a PBX may transmit a SIP OPTIONS ping to the ESBC to check if the connectivity is working with ESBC at regular intervals (say, after every 10 seconds), which time interval can be also be varied. In another instance, the user equipment detects failures based on request timeouts.

The at least one telephone system [102] is further configured to establish a connection with a second network entity [104B] of the network via a second access node [103B], in an event the connectivity with the first network entity [104A] via the first access node [103A] fails. The present invention encompasses that the first network entity [104A] is a Primary Enterprise Access Session Border Controller (PR-ESBC) and the second network entity [104B] is a Secondary Enterprise Access Session Border Controller (GR-ESBC). The present invention further encompasses that the first access node [103A] and the second access node [103B] are based on the Session Initiation Protocol (SIP). In an instance of the present invention, wherein the at least one SIP service is a calling service, the invention encompasses that the first access node [103A] and the second access node [103B] are based on the Voice over Internet Protocol (VoIP). For instance, in operation, in an event, the connectivity between the primary Enterprise Access Session Border Controller (PR-ESBC) at the network and the PBX fails, but the secondary ESBC (GR-ESBC here) can be reached from the PBX, the PBX establishes a connection with the GR-ESBC.

Further, the at least one telephone system [102] is further configured to transmit a signalling request to avail the at least one SIP service, via the second access node [103B], to the application server [101] connected to the second network entity [104B]. Further, the present invention also encompasses configuring, the at least one telephone system [102], to avail at least one SIP trunk service from the application server [101] connected to the second network entity [104B] via the second access node [103B]. The present invention encompasses that the at least one telephone system [102] is configured to avail the at least one SIP trunk service from the second network entity [104B] via the second access node [103B] further comprises executing at least one of a transmission control protocol (TCP) or a user datagram protocol (UDP) or any other connectivity protocol known to a person skilled in the art.

The system [100] of the present invention further encompasses that the at least one telephone system [102] avails the at least one SIP trunk service from the second network entity [104B] via the second access node [103B] based on the IP address of the second network entity [104B]. For the above instance, in an event, the connectivity between the primary Enterprise Access Session Border Controller (PR-ESBC) at the network and the PBX fails, but the secondary ESBC (GR-ESBC here) can be reached from the PBX, a primary and a secondary SIP Proxy server IP address as PR and GR-ESBC IP addresses are configured at the PBX. Thus, PBX utilizes available TCP (or UDP) connection for signalling towards GR-ESBC IP addresses and starts transmitting data to the GR-ESBC over TCP (or UDP) connection.

The system [100] of the present invention further encompasses that the at least one telephone system [102] registers the at least one telephone unit with the network and provide an IP Multimedia Private Identity (IMPI) and an IP Multimedia Public Identity (IMPU) to each of the at least one telephone unit. The present invention further encompasses each of the at least one telephone unit comprises at least one IMPI and at least one IMPU, where different IMPI and IMPU shall be used for connecting over different network entity.

As used herein, "IP Multimedia Private Identity (IMPI)" can be understood as a unique permanently allocated global identity assigned by the home network operator, of the form of a Network Access Identifier (NAI) i.e. user.name@domain, and is used, for example, for Registration, Authorization, Administration, and Accounting purposes. As used herein, "IP Multimedia Public Identity (IMPU)" can be understood as an identifier used by any user for requesting communications to other users (e.g. contact number included on a business card).

The application server [101] is further configured to process the signalling request received from the at least one telephone system [102] via the second access node [103B]. For instance, the present invention encompasses that for a signalling request received at the BTAS from a PBX via SIP (second access node), the BIAS treats the signalling request as if it were coming from the PR-ESBC. The application server [101] is further configured to provide the at least one SIP trunk service to the at least one telephone system [102] via the second access node [103B].

The network may further comprise of an HSS (Home Subscriber Server), DNS (Domain Name server), Proxy call session control function (P-CSCF), Interrogating call session control function (I-CSCF), a Serving call session control function (S-CSCF), an Emergency call session control function (E-CSCF), a Interconnect border control function (I-BCF) and a Breakout gateway control function (BGCF), wherein the said components enable delivery of required voice services in a network. For instance, HSS may be configured to register and store the data of one or more subscriber using two different IMPIs using the same domain.

In another instance, DNS may be configured to maintain a track of URI resolution based on the query received from the one or more subscribers and may be configured for additional domain entries to be resolved by network entities, for example, a GR-ESBC. In another instance, the invention encompasses that the components P-CSCF, S-CSCF, I-CSCF, E-CSCF, BGCF, I-BCF facilitate delivery of voice services as already known in the field of SIP trunk communication.

The present invention encompasses that the second network entity [104B] is connected to the application server [101] via at least one of a Call State Control Function (CSCF) unit and an Interconnection Border Control Function (IBCF) unit. Although a limited number of user equipment [200], network entity [300], adaptor [102], application server [200] are shown in FIG. 1, however, it will be appreciated by those skilled in the art that the invention encompasses the use of multiple such components.

Figure 2:
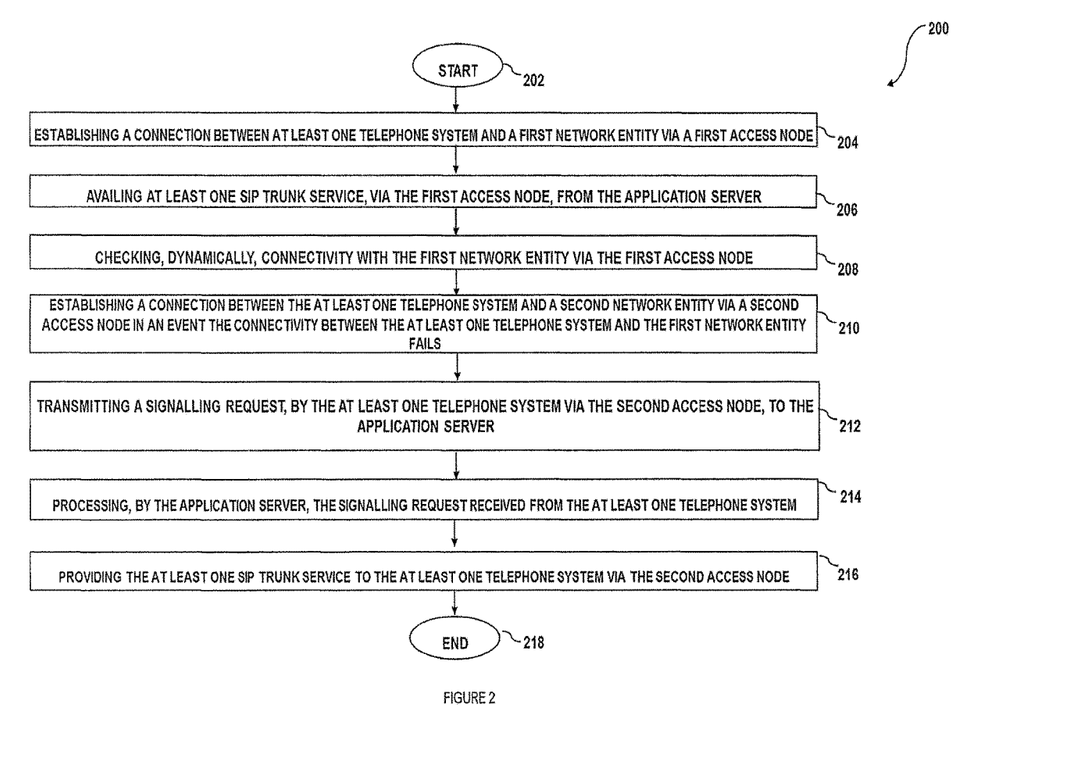
FIG. 2 illustrates an exemplary method flow diagram depicting method [200] for providing at least one SIP trunk service to at least one telephone system by an application server over a network, in accordance with exemplary embodiments of the present disclosure.

FIG. 2 illustrates an exemplary method flow diagram depicting method [200] for providing at least one SIP trunk service to at least one telephone system by an application server over a network, in accordance with exemplary embodiments of the present disclosure.

The method starts at step 202. At step 204, the method comprises establishing a connection between at least one telephone system [102] and a first network entity [104A] of the network via a first access node [103A], wherein said first network entity [104A] is connected to the application server [101]. Next, at step 206, the at least one telephone system [102] starts availing at least one SIP trunk service, via the first access node [103A], from the application server [101] connected to the first network entity [104A].

Further, at step 208, the at least one telephone system [102] keeps checking, dynamically, it's connectivity with the first network entity [104A] via the first access node [103A]. The at least one telephone system [102], dynamically, checks connectivity with the first network entity [104A] via the first access node [103A] at regular intervals of time. For instance, the at least one telephone system [102] dynamically checks connectivity with the first network entity [104A] via the first access node [103A] after every 10 sec., which time interval can be varied. For another instance, the present invention encompasses that the at least one telephone system [102] may detect failures at the at least one access node [104] based on request timeouts.

Furthermore, at step 210, the at least one telephone system [102] establishes a connection between the at least one telephone system [102] and a second network entity [104B] of the network via a second access node, in an event the connectivity between the at least one telephone system [102] and the first network entity [104A] via the first access node [103A] fails, wherein said second network entity [104B] is connected to the application server [101]. For instance, in an event, the connectivity between the primary Enterprise Access Session Border Controller (PR-ESBC) at the network and the PBX fails, the PBX establishes a connection with the secondary Enterprise Access Session Border Controller (GR-ESBC here) can be reached from the PBX, a primary and a secondary SIP Proxy server IP address as PR and GR-ESBC IP addresses are configured at the PBX.

The method [200] of the present invention encompasses that the first network entity [104A] is a Primary Enterprise Access Session Border Controller (PR-ESBC) and the second network entity [104B] is a Secondary Enterprise Access Session Border Controller (GR-ESBC). The present invention further encompasses that the first access node [103A] and the second access node [103B] are based on the Session Initiation Protocol (SIP). In an instance of the present invention, wherein the at least one SIP service is a calling service, the present invention encompasses that the first access node [103A] and the second access node [103B] are based on the Voice over Internet Protocol (VoIP). For instance, in operation, in an event, the connectivity between the primary Enterprise Access Session Border Controller (PR-ESBC) at the network and the PBX fails, but the secondary ESBC (GR-ESBC here) can be reached from the PBX, the PBX establishes a connection with the GR-ESBC.

Further, the method [200] of the method [200] of the present invention encompasses configuring, the at least one telephone system [102], to avail at least one SIP trunk service from the application server [101] connected to the second network entity [104B] via the second access node [103B]. The present invention encompasses that the at least one telephone system [102] is configured to avail the at least one SIP trunk service from the second network entity [104B] via the second access node [103B] further comprises executing, at the at least one telephone system [102], at least one of a transmission control protocol (TCP) and a user datagram protocol (UDP) or any other data connectivity protocol known to a person skilled in the art.

The method [200] of the present invention further encompasses that the at least one telephone system [102] avails the at least one SIP trunk service from the second network entity [104B] via the second access node [103B] based on the IP address of the second network entity [104B]. For the above instance, in an event, the connectivity between the primary Enterprise Access Session Border Controller (PR-ESBC) at the network and the PBX fails, but the secondary ESBC (GR-ESBC here) can be reached from the PBX, a primary and a secondary SIP Proxy server IP address as PR and GR-ESBC IP addresses are configured at the PBX. Thus, PBX utilises available TCP (or UDP) connection for signalling towards GR-ESBC IP addresses, and starts transmitting data to the GR-ESBC over TCP (or UDP) connection.

The method [200] of the present invention further encompasses that the at least one telephone system [102] registers the at least one telephone unit with the network and provide an IP Multimedia Private Identity (IMPI) and an IP Multimedia Public Identity (IMPU) to each of the at least one telephone unit. The present invention further encompasses each of the at least one telephone unit comprises at least one IMPI and at least one IMPU, where different IMPI and IMPU shall be used for connecting over different network entity.

Next, at step 212, the at least one telephone system [102] transmits a signalling request to avail the at least one SIP service, via the second access node, to the application server [101] connected to the second network entity [104B].

Subsequently, at step 214, the application server [101] connected to the second network entity [104B] processes the signalling request received from the at least one telephone system [102] via the second access node. Finally, at step 216, the application server [101] connected to the second network entity [104B] provides the at least one SIP trunk service, to the at least one telephone system [102] via the second access node. The method finishes at step 218.

Figure 3:
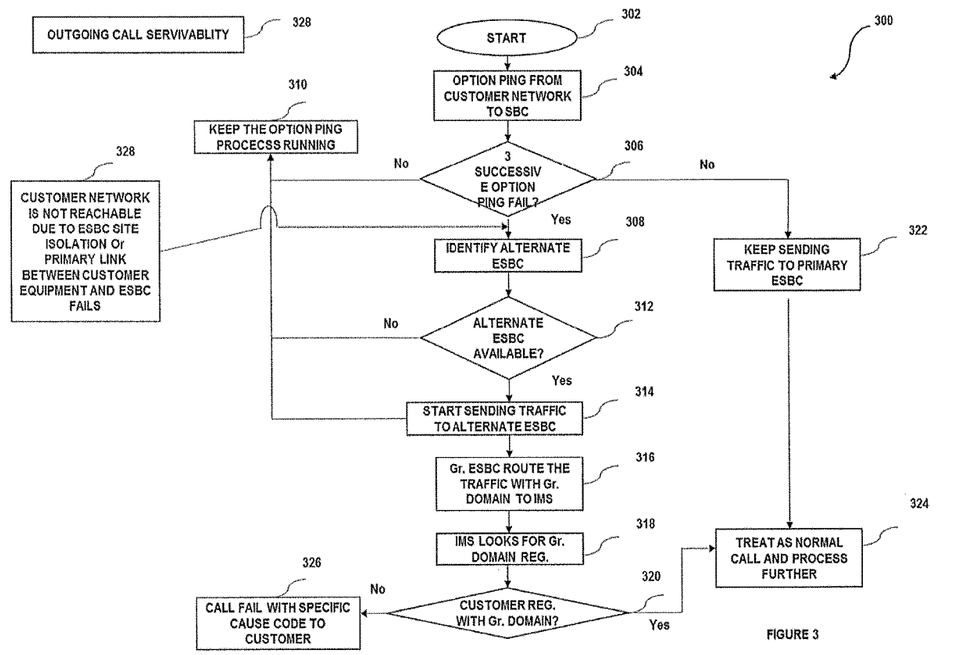
FIG. 3 illustrates an exemplary high-level schematic call flow diagram depicting method [300] for providing at least one SIP trunk service to at least one telephone system by an application server over a network, in accordance with exemplary embodiments of the present disclosure.

FIG. 3 illustrates an exemplary high-level schematic call flow diagram depicting method [300] for providing at least one SIP trunk service to at least one telephone system [102] by an application server [101] over a network, in accordance with exemplary embodiments of the present disclosure. In an exemplary operation, the method starts at step 301. At step 302, PBX (telephone system) checks connectivity with the first network entity (PR-ESBC) by sending OPTION ping, and at step 306, upon identifying three successive failures, PBX checks availability of alternate ESBC (step 312) starts sending calls towards GR-ESBC. Accordingly, at step 316, GR-ESBC sends the call to respective registered P-CSCF and in turn to the S-CSCF. At step 324, BIAS will treat this call as originated over VoIP. The BTAS CDR will reflect if the calls are originated from PR or GR-ESBC based on the domain received in the call. At step 306, upon determining that the first access node is working, at step 310, PBX will restore the link failure and starts sending traffic to PR-ESBC which will follow normal call flow. Alternatively, the PBX may choose not to move the traffic to Primary ESBC (or can do it in a controlled phase to avoid existing call failures on primary link restoration).

In another instance, the present invention encompasses that the telephone unit [102] (PBX or UBE or UCM) identifies a failure in the connectivity with the PR-ESBC and thus, it starts transmitting calls to the GR-ESBC. Next, the GR-ESBC sends the call to respective registered P-CSCF which in turn routes the call to the registered S-CSCF. Further, S-CSCF transmits the call over to the BTAS which treats the call in a manner that the call originated via the PR-ESBC and treats the call in a usual manner. Accordingly, the BTAS reflects that the calls originated from PR-ESBC or GR-ESBC based on the domain received in the call. The present instance further encompasses that upon restoration of the link failure, the telephone system sends calls (or generally traffic) to PR-ESBC which will follow normal call flow. The invention further encompasses that a subscriber of the telephone system may choose not to move the traffic to PR-ESBC upon restoration of the link failure and may continue to send traffic over GR-ESBC.

Figure 4:
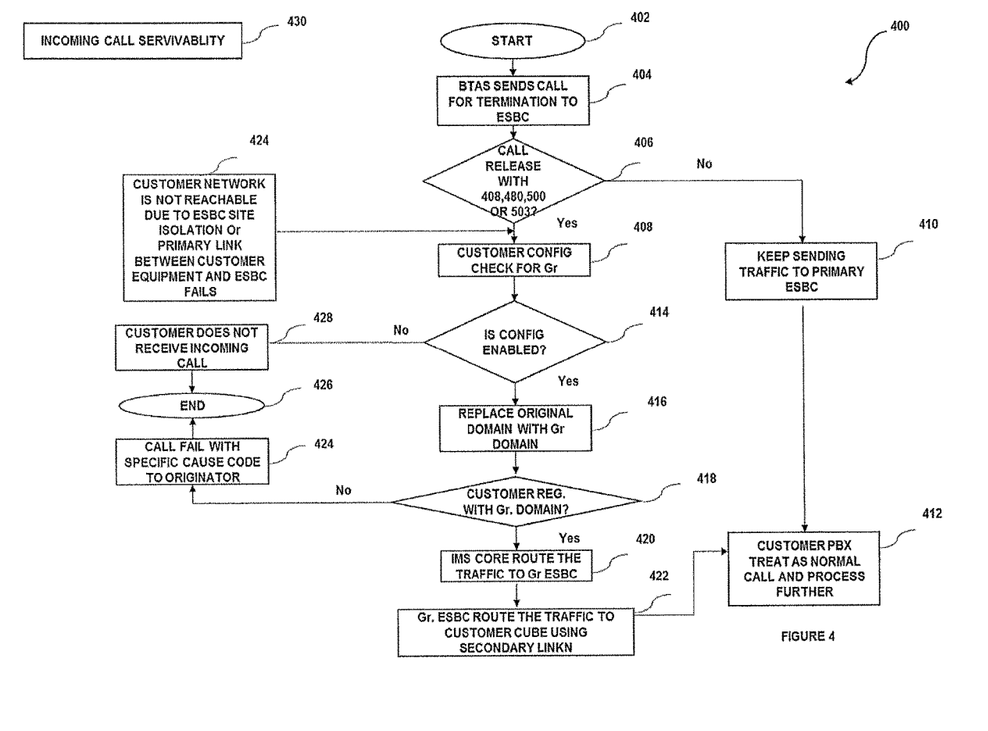
FIG. 4 illustrates another exemplary high-level schematic call flow diagram depicting method for providing at least one SIP trunk service to at least one telephone system by an application server over a network, in accordance with exemplary embodiments of the present disclosure.

FIG. 4 illustrates another exemplary high-level schematic call flow diagram depicting method for providing at least one SIP trunk service to at least one telephone system [102] by an application server [101] over a network, in accordance with exemplary embodiments of the present disclosure. In an exemplary operation, the method starts at step 301. At step 404, calls received by BTAS will be tried on the PR-ESBC as a first choice, as ENUM will always resolve the primary domain. At step 406, PR-ESBC sends a 503/500 error response to BTAS. At step 408, BTAS checks whether the PBX has as a GR-ESBC configuration. At step 416, BTAS shall replace the original domain with the domain of the GR-ESBC, and the BTAS treats this call as a new originating call and will send it to same S-CSCF (for instance, late forwarding). Next, at step 420, S-CSCF will send the call to IBCF based on the DNS query sent for GR domain. At step 422, IBCF will send the call to respective I-CSCF, and I-CSCF will forward the call to S-CSCF where the customer is registered with GR domain. Subsequently, at step 412, when the call reaches to BTAS will be treated as a normal call termination request to GR-ESBC.

Additionally, the exemplary call flow diagram encompasses that the call would be terminated via S-CSCF and P-CSCF to GR-ESBC. Accordingly, GR-ESBC will terminate the call to PBX. At step 406, upon determining that the first access node is working, at step 412, PBX on restoration of the link the calls would be treated as Normal termination and will not fall back to GR unless PBX sends the cause code (408, 480, 500 or 503).

The exemplary call flow diagram further encompasses that in event of multiple failures on the primary path, BTAS may choose to blacklist the primary route and keep trying the path once in 10 or 100 calls (based on configuration). BTAS will add GR domain based on error codes as well as in case of PR route blacklisting.

Further, the exemplary call flow diagram of FIG. 4, further encompasses providing for Dual Registrations from ESBCs, where Both ESBC's will register with IMS core with different domains. The primary ESBC will have primary domain while GR-ESBC will have a secondary domain configured. The Register will consist of the same number but with different domains. The IMPU and IMPI in Register will be different on the basis of the domain used as per primary and secondary ESBC. The S-CSCF selection by HSS can be the same or different as these registrations can reside on different S-CSCF also.

Figure 5:
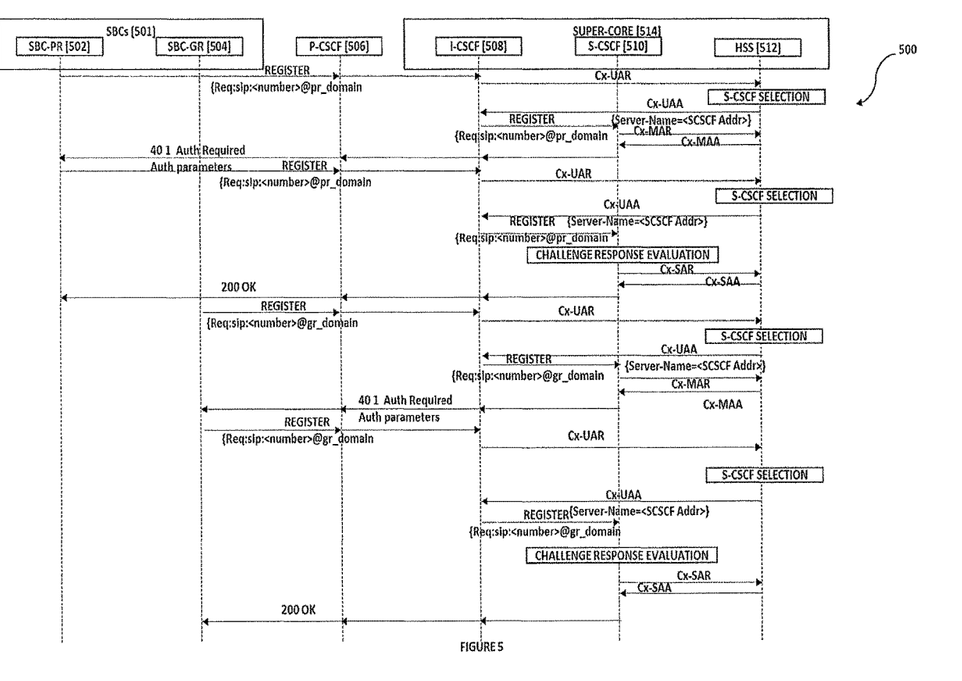
FIG. 5 illustrates an exemplary signal flow diagram [500] depicting an exemplary method for providing at least one SIP trunk service to at least one telephone system by an application server over a network using VoLTE/FLP calling when Primary ESBC is down, in accordance with exemplary embodiments of the present disclosure.

FIG. 5 illustrates an exemplary signal flow diagram [500] depicting an exemplary method for providing at least one SIP trunk service to at least one telephone system [102] by an application server [101] over a network using VoLTE/FLP calling when Primary ESBC is down, in accordance with exemplary embodiments of the present disclosure. The high-level signal flow diagram of FIG. 5 involves a PR-ESBC, a GR-ESBC, a P-CSCF, an I-CSCF, an S-CSCF and an HSS, and provides for events when VoLTE/FLP calling and Primary ESBC is down.

Per the signal flow diagram of FIG. 5, ENUM will always resolve the query to a primary domain of number that is the registration of Primary ESBC. The BTAS will decide the forward call to GR domain on receiving the response from the primary domain like whether to forward or not. As a result, the BTAS will perform domain-based routing and will forward INVITE towards IBCF of FLP GR domain.

Figure 6:
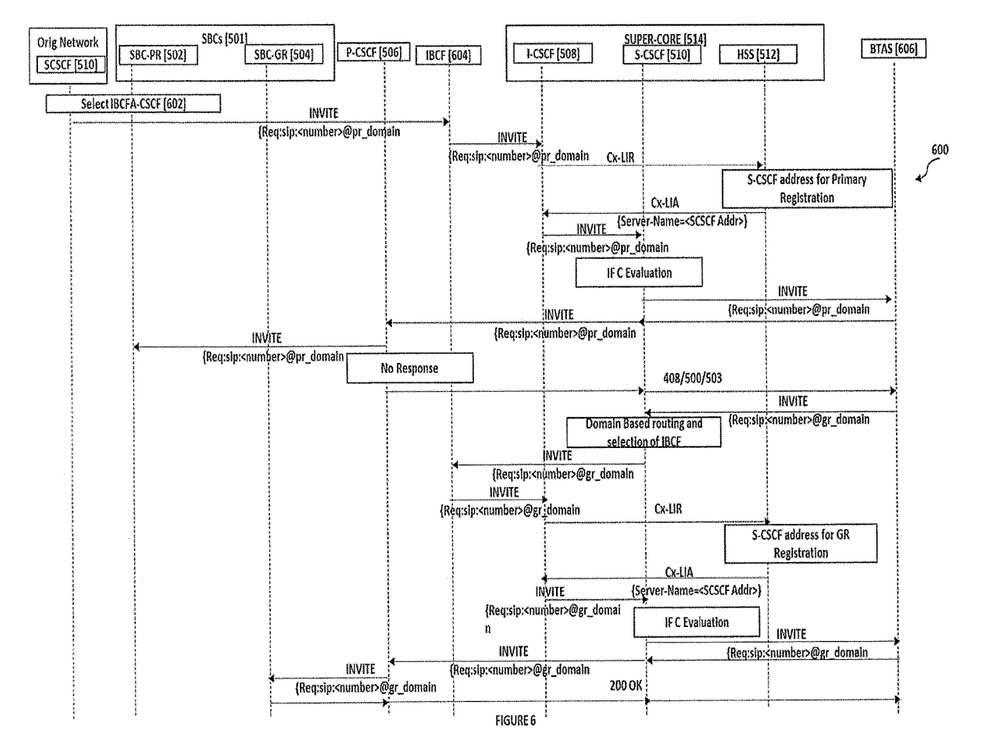
FIG. 6 illustrates an exemplary signal flow diagram [600] depicting an exemplary method for providing at least one SIP trunk service to at least one telephone system by an application server over a network using Offnet calling when Primary ESBC is down/not reachable, in accordance with exemplary embodiments of the present disclosure.

FIG. 6 illustrates an exemplary signal flow diagram [600] depicting an exemplary method for providing at least one SIP trunk service to at least one telephone system [102] by an application server [101] over a network using Offnet calling when Primary ESBC is down/not reachable, in accordance with exemplary embodiments of the present disclosure. The high-level signal flow diagram of FIG. 6 involves a PR-ESBC, a GR-ESBC, a P-CSCF, an I-CSCF, an S-CSCF, IBCF and an HSS, and provides for events when Offnet calling is chosen in event of Primary ESBC being down.

Per the signal flow diagram of FIG. 6, ENUM will always resolve the query to the primary domain of number that is Registration of Primary ESBC. MGCF will perform ENUM query here before sending INVITE to IMS core. So, the IMS core will always receive requests in SIP format. BTAS will decide the forward call to GR domain on receiving the response from the primary domain like whether to forward or not. BTAS will perform domain-based routing and will forward INVITE towards IBCF of FLP GR domain.

Figure 7:
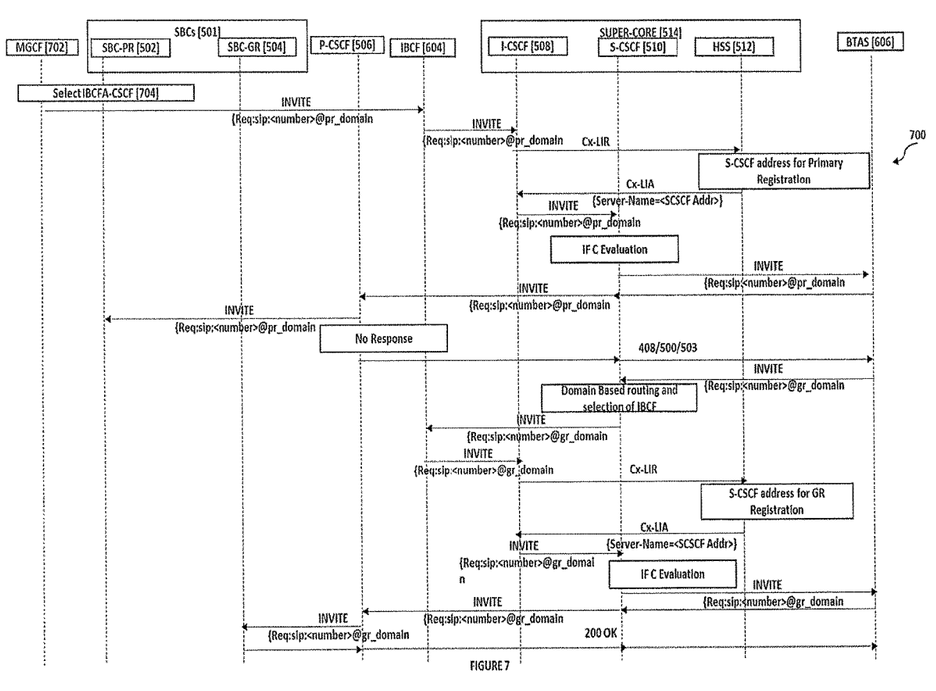
FIG. 7 illustrates an exemplary signal flow diagram [700] depicting an exemplary method for providing at least one SIP trunk service to at least one telephone system by an application server over a network using Offnet calling and Primary ESBC is down/not reachable, in accordance with another exemplary embodiment of the present disclosure.

FIG. 7 illustrates an exemplary signal flow diagram [700] depicting an exemplary method for providing at least one SIP trunk service to at least one telephone system [102] by an application server [101] over a network using Offnet calling when Primary ESBC is down/not reachable, in accordance with exemplary embodiments of the present disclosure. The high-level signal flow diagram of FIG. 7 involves a PR-ESBC, a GR-ESBC, a P-CSCF, an I-CSCF, an S-CSCF, MGCF, IBCF and an HSS, and provides for events when Offnet calling is chosen in event of Primary ESBC being down.

Per the signal flow diagram of FIG. 7, MGCF will perform ENUM query here before sending INVITE to IMS core. So, the IMS core will always receive a request in SIP format And BTAS will decide the forward call to GR domain on receiving the response from a primary domain like whether to forward or not. As a result, the BTAS will perform domain-based routing and will forward INVITE towards IBCF of FLP GR domain.

Therefore, as is evident from the above disclosure, the present invention provides system and method for providing at least one SIP trunk service to at least one telephone system [102] by an application server [101] over a network even when one of the access nodes is down, while such telephone system is connected on the LAN with the fiber backhaul or vice versa. Thus, the present invention provides technical advancements to SIP trunk based service which wholly relied on the VoIP for availing the services and caused service disruption upon loss of connectivity over VoIP. Also, the solution of the present invention is advantageous as it provides maximum uptime for voice services by way of an alternate connectivity mechanism in case of an outage. The present solution, thus, solves the problem of service disruption in event of access node failure in order to provide continuity in service even though the Primary nodes are isolated, thus ensuring better user experience.

The interface, module, memory, database, processor and component depicted in the figures and described herein may be present in the form of a hardware, a software and a combination thereof. The connection shown between these components/module/interface in the system [100] are exemplary, and any components/module/interface in the system [100] may interact with each other through various logical links and/or physical links. Further, the components/module/interface may be connected in other possible ways.

Though a limited number of servers, gateways, user equipment, network, interface, module, memory, database, processor and component have been shown in the figures, however, it will be appreciated by those skilled in the art that the overall system of the present invention encompasses any number and varied types of the entities/elements such as servers, gateways, user equipment, network, interface, module, memory, database, processor and component.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method of providing at least one SIP trunk service to at least one
   telephone system by an application server over a network, the method comprising:
   establishing a connection between the at least one telephone system and a first network entity of the network via a first access node, wherein said first network entity is a Primary Enterprise Access Session Border Controller (PR-ESBC) and is connected to the application server;
   availing the at least one SIP trunk service, by the at least one telephone system via the first access node, from the application server connected to the first network entity;
   checking, dynamically, by the at least one telephone system, connectivity with the first network entity via the first access node;
   establishing a connection between the at least one telephone system and a second network entity of the network via a second access node wherein the second network entity is a Secondary Enterprise Access Session Border Controller (GR-ESBC), in an event the connectivity between the at least one telephone system and the first network entity via the first access node fails, wherein said second network entity is connected to the application server;
   transmitting a signaling request to avail the at least one SIP service, by the at least one telephone system via the second access node, to the application server connected to the second network entity;
   configuring the at least one telephone system to avail at least one SIP trunk service, via the second access node, from the application server connected to the second network entity;
   processing, by the application server connected to the second network entity, the signaling request received from the at least one telephone system via the second access node;
   selecting, by the application server, a domain associated with the second network entity based on an identification of error code received from the at least one telephone system; and
   providing the at least one SIP trunk service, based on the selected domain to the at least one telephone system via the second access node, by the application server connected to the second network entity.

2. The method as claimed in claim 1, wherein the first access node and the second access node are based on the Session Initiation Protocol (SIP).

3. The method as claimed in claim 1, wherein the at least one telephone system is one of a Private Branch Exchange (PBX), a Unified Border Element (UBE) and a Unified Communications Manager (UCM).

4. The method as claimed in claim 1, wherein configuring the at least one telephone system to avail the at least one SIP trunk service, via the second access node, from the application server connected to the second network entity further comprises executing, at the at least one telephone system, at least one of a transmission control protocol (TCP) or user datagram protocol (UDP).

5. The method as claimed in claim 4, wherein the at least one telephone system avails the at least one SIP trunk service, via the second access node, from the application server connected to the second network entity based on the IP address of the second network entity.

6. The method as claimed in claim 1, wherein the second network entity is connected to the application server via at least one of a Call State Control Function (CSCF) unit and an Interconnection Border Control Function (IBCF) unit.

7. The method as claimed in claim 1, wherein the at least one SIP service is a calling service.

8. The method as claimed in claim 7, wherein the first access node and the second access node are based on the Voice over Internet Protocol (VoIP).

9. The method as claimed in claim 1, wherein the at least one telephone system checks, dynamically, connectivity with the first network entity via the first access node at regular interval of time.

10. A system comprising non-transitory computer-readable storage medium storing one or more sequences of instructions which, instructions executed by one or more processors cause the system to provide at least one SIP trunk service to at least one telephone system by an application server over a network, the system comprising:

the application server connected to the network via at least one network entity and configured to provide the at least one SIP trunk service to the at least one telephone system over the network;

the at least one network entity connected to the application server and configured to route the at least one SIP trunk service to the at least telephone system;

at least one telephone system configured to:
  establish a connection with a first network entity of the network via a first access node wherein the first network entity is a Primary Enterprise Access Session Border Controller (PR-ESBC); and
  avail at least one SIP trunk service, via the first access node, from the application server connected to the first network entity;
  check, dynamically, connectivity with the first network entity via the first access node;
  establish a connection with a second network entity of the network via a second access node, in an event the connectivity with the first network entity via the first access node fails, wherein the second network entity is a Secondary Enterprise Access Session Border Controller (GR-ESBC);
  transmit a signaling request to avail the at least one SIP service, via the second access node, to the application server connected to the second network entity;

the application server further configured to:
  process the signaling request received from the at least one telephone system via the second access node;
  select a domain associated with the second network entity based on an identification of error code received from the at least one telephone system; and
  provide the at least one SIP trunk service based on the selected domain to the at least one telephone system via the second access node; and the at least one telephone system implements a configuration to avail at least one SIP trunk service, via the second access node, from the application server connected to the second network entity.

* * * * *